US008230821B2

(12) United States Patent
Kerns

(10) Patent No.: US 8,230,821 B2
(45) Date of Patent: Jul. 31, 2012

(54) HEAD RESTRAINT FOR ANIMAL CONTROL CHUTE

(75) Inventor: Russell W. Kerns, Jane Lew, WV (US)

(73) Assignee: Cattle Republic, Inc., Henderson, NV (US)

( * ) Notice: Subject to any disclaimer, the term of this patent is extended or adjusted under 35 U.S.C. 154(b) by 155 days.

(21) Appl. No.: 12/430,366

(22) Filed: Apr. 27, 2009

(65) Prior Publication Data

US 2009/0266308 A1    Oct. 29, 2009

Related U.S. Application Data

(60) Provisional application No. 61/047,900, filed on Apr. 25, 2008.

(51) Int. Cl.
*A01K 15/04* (2006.01)
(52) U.S. Cl. .......................... 119/734; 119/735; 119/729
(58) Field of Classification Search .................. 119/729, 119/731, 734, 735
See application file for complete search history.

(56) References Cited

U.S. PATENT DOCUMENTS

| 2,136,008 A * | 11/1938 | Gregory ........................ 119/734 |
| 2,564,317 A * | 8/1951 | Whitworth ..................... 119/733 |
| 3,691,998 A | 9/1972 | Luinstra ........................ 119/734 |
| 4,513,690 A | 4/1985 | Waldron ........................ 119/733 |
| 4,531,478 A | 7/1985 | Forrest ............................. 119/98 |
| 4,549,501 A * | 10/1985 | Anderson et al. ............. 119/729 |
| 4,579,084 A * | 4/1986 | McCan et al. ................ 119/731 |
| 4,702,200 A * | 10/1987 | Simington .................... 119/734 |
| 4,771,737 A | 9/1988 | Lynch ............................. 119/99 |
| 4,782,791 A | 11/1988 | Brock .......................... 119/732 |
| 5,109,802 A | 5/1992 | Priefert ........................ 119/730 |
| 5,184,572 A | 2/1993 | Meier .............................. 119/99 |
| 5,263,438 A | 11/1993 | Cummings .................... 119/734 |
| 5,329,882 A * | 7/1994 | Hunt ............................. 119/757 |
| 5,383,425 A | 1/1995 | Bleacher ....................... 119/729 |
| 5,645,016 A | 7/1997 | Mahurin ....................... 119/751 |
| 5,651,333 A | 7/1997 | Fisher ........................... 119/734 |
| 6,537,145 B1 * | 3/2003 | Derouin et al. ................. 452/54 |
| 6,752,438 B2 * | 6/2004 | DeSouza ....................... 292/238 |
| 7,225,759 B2 * | 6/2007 | Kerns ............................ 119/732 |
| 2006/0169220 A1 | 8/2006 | Kerns ............................ 119/732 |

FOREIGN PATENT DOCUMENTS

GB            814686          6/1959

* cited by examiner

*Primary Examiner* — Son T Nguyen
*Assistant Examiner* — Kathleen Iwasaki
(74) *Attorney, Agent, or Firm* — Alvin T. Rockhill

(57) ABSTRACT

The present invention provides an improved head restraint that can be used in conjunction with conventional cattle chutes that are equipped with head gates. It provides the advantages of being humane by causing little or no discomfort to the cattle being restrained. Cattle being treated also tends to remain calm while being restrained utilizing the device of this invention. It offers much easier and faster means for providing care to positions on the head of the animal. Its implementation can accordingly lead to reduction in human labor requirements associated with treating a herd of cattle and generally leads to savings in medication by virtue of being able to more accurately apply eye drops, ointments, or powdered medications to the eyes of a cow having a very stabilized head as compared to loss of medication when dealing with a struggling animal that is jerking its head around during the procedure. Its use greatly reduces the risk of injury to the animal and the person administering the treatment to the animal. Head restraints of this invention offer the advantage of being capable of being affixed to existing chutes of differing sizes. This is because the improved head restraints of this invention are expandable to fit directly onto head gates of differing designs and sizes.

16 Claims, 15 Drawing Sheets

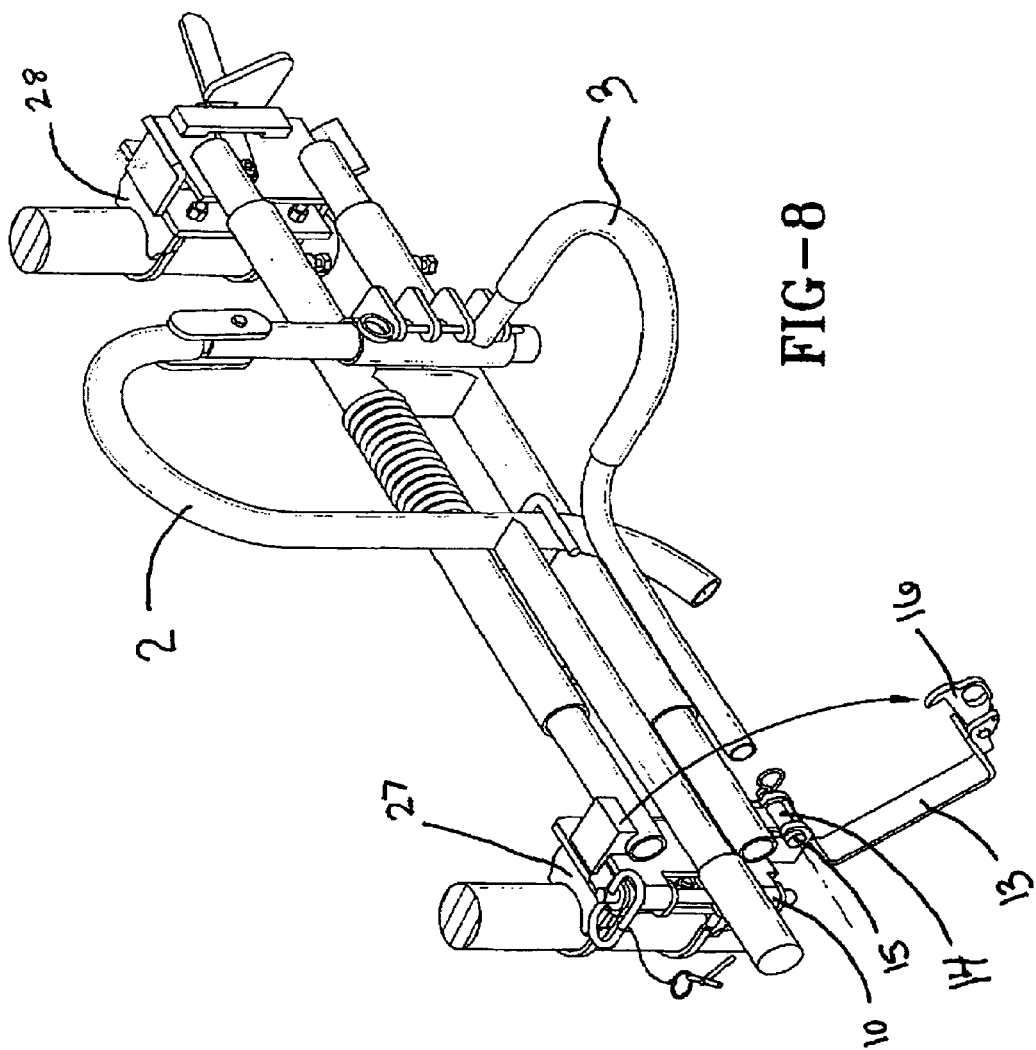

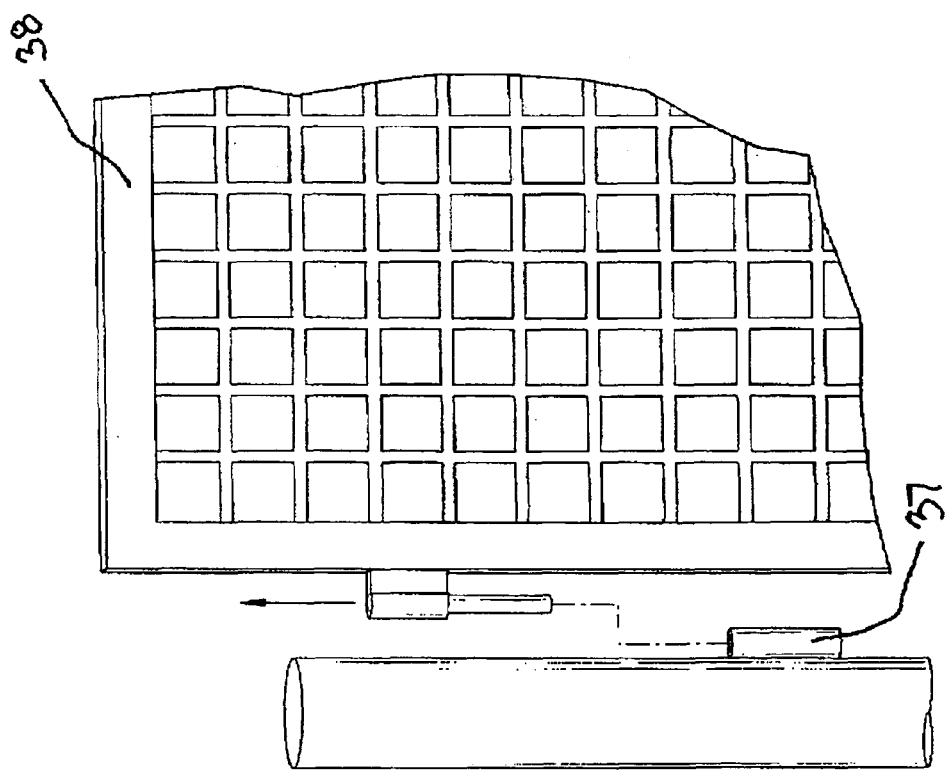
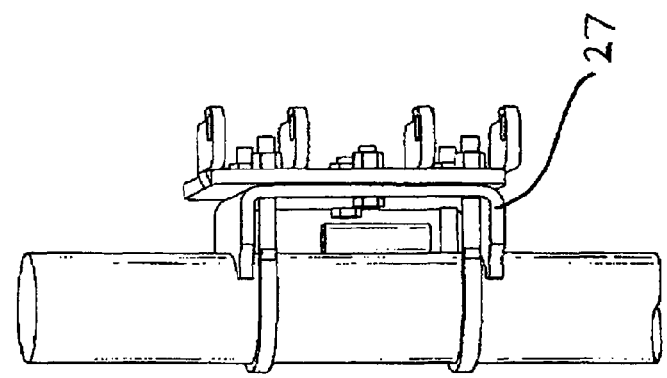

HEAD RESTRAINT FOR ANIMAL CONTROL CHUTE

This application claims benefit of U.S. Provisional Patent Application Ser. No. 61/047,900, filed on Apr. 25, 2008. The teachings of U.S. Provisional Patent Application Ser. No. 61/047,900 are incorporated herein by reference in their entirety.

BACKGROUND OF THE INVENTION

From time to time, all types of cattle require treatment by a farmer, rancher or veterinarian. These treatments may include procedures such as inserting eye drops, administering medicine or vitamins orally, dehorning, attaching ear tags for identifying the particular animal, or attaching and removing insecticide ear tags. In performing such procedures, it is necessary to restrain the head of the animal. Various devices have been developed for temporarily holding and restraining livestock while allowing access to the head of the animal for treatment (see U.S. Pat. No. 5,263,438, U.S. Pat. No. 5,109,802 and U.S. Pat. No. 4,782,791.)

Commonly, the cattle are herded into a narrow chute developed to hold the animal while the various treatments are administered. Typically the chutes comprise a pair of movable side walls which prevents the animal from turning around and entrance and exit gates which when closed prevent the animal from moving forward or backward in the chute. The exit gate is generally referred to in the trade as a head gate and it includes a pair of similar gates which move across the chute opening from both sides to a closed position defining a head opening therebetween. Once the cow reaches the proper position in the chute, the pair of head gates is closed around its neck, thus restricting its further movement. By reason of the massive weight of the animal and its excited condition as the head gates close around its neck, frequently there is a substantial impact of the animal with the head gate structure. Due to the substantial weight and strength of cattle, the squeeze chute structure and the head gates are constructed of relatively heavy gauge steel which has relatively no give or deflection. Quite frequently this containment operation results in injury to the animals as they thrash around and impact a very rigid steel structure. Cattle squeeze chutes of this type have been commercially available for many years for use by farmers, ranchers or veterinarians.

Even though conventional head restraints are effective in many respects for restraining animals in order to perform many procedures, conventional head restraints do not provide adequate restraint to perform many procedures on the head of an animal. Conventional restraints allow the cow to move its head from side to side or up and down, making the performance of these procedures difficult. To facilitate the performance of procedures on the heads of cattle, typically a bull lead is inserted into nostrils of the animal and is used to hold the animal's head in a downward orientation. Bull leads clamp against the flesh between the animal's nostrils and pinch tighter by pulling on a rope which is typically attached to the bull lead. The rope attached to the bull lead is frequently tied to a heavy object such as a concrete block or tied to a fixed position on the head gate which is designed for that purpose. The use of the bull lead is painful for the animal, frequently causing it to cry and squeal. When a bull lead is used as a head restraint, the animal frequently struggles, making the application of eye drops or other procedures being done on the head of the animal difficult. The more the animal struggles, the longer the procedure takes. Frequently, in the application of eye drops, as the cow moves its head around, a significant amount of eye drops miss the eye and are lost. During dehorning or ear tagging, it is desirable for the animal's head to remain still in order to minimize the amount of pain or discomfort experienced by the animal.

The head restraint described in U.S. Pat. No. 7,225,759 was developed as a more humane means for restraining the heads of cattle that are being treated and as an easier means for treating the heads of cattle which reduces the amount of time spent struggling with the animal. It also offers a faster way to restrain cattle coming through the chute and a means for providing a greater level of stability to the head so that eye drops and other medication could be supplied more accurately to avoid loss of medication. The head restraint described in U.S. Pat. No. 7,225,759 also provides a more effective means for restraining the heads of cattle which is beneficial in performing other procedures, such as dehorning and attaching tags to ears more accurately.

U.S. Pat. No. 7,225,759 more specifically described a head restraint for utilization in conjunction with a cattle chute, said head restraint being comprised of a lower neck restraint, an upper neck restraint which is mounted to the lower neck restraint, a nose restraint which is mounted to the lower neck restraint, and a means for affixing the head restraint to the cattle chute, wherein the upper neck restraint is adapted to swivel into a position forming an inverted U-shape over the top of the lower neck restraint, and wherein the nose restraint is adapted to swivel by horizontal motion into a position forming a closed U-shape with the lower neck restraint.

SUMMARY OF THE INVENTION

The present invention provides a head restraint that can be used in conjunction with conventional cattle chutes that are equipped with head gates. The head restraint apparatus of this invention provides the advantages of being humane by causing little or no discomfort to the cattle being restrained. Cattle being treated also tends to remain calm while being restrained utilizing the device of this invention as compared to conventional restraint procedures, such as the employment of a bull lead. It offers much easier and faster means for providing care to positions on the head of the animal. Its implementation can accordingly lead to reduction in human labor requirements associated with treating a herd of cattle and generally leads to savings in medication by virtue of being able to more accurately apply eye drops, ointments, and powdered medications to the eyes of a cow having a very stabilized head as compared to loss of eye drops when dealing with a struggling animal that is jerking its head around during the procedure.

The head restraint of this invention can also be beneficially utilized in administering hypodermic injections of medication into the necks of cattle. Shots in the neck can be given much more easily, quickly, and accurately to an animal that is being restrained with the head restraint of this invention to prevent the animal's neck from moving or jerking at the time that the injection is being administered. This greatly reduces the risk of injury to the animal and the person administering the shot and also reduces the possibility of bending or breaking the hypodermic needle.

The head restraints of this invention offer the advantage of being capable of being affixed to existing chutes of differing sizes. This is because the improved head restraints of this invention are expandable to fit directly onto head gates of differing sizes. The head restraints of this invention are also designed to fit head gates that include flanges on the head gate posts to which the head restraint is attached. Another advantage of the cattle head restraints of this invention is that they are of a light weight design that can be manufactured utilizing conventional steel piles and/or tubes and plates.

The present invention more specifically discloses a head restraint for utilization in conjunction with a cattle chute, said head restraint being comprised of a lower neck restraint, an upper neck restraint which is mounted to the lower neck restraint, a nose restraint which is mounted to the lower neck restraint, a first cattle chute attachment adaptor, and a second cattle chute attachment adaptor, wherein the lower neck restraint is comprised of an upper tubular member and a lower tubular member, wherein the first cattle chute attachment adaptor and the second cattle chute attachment adaptor are attached to the lower neck restraint through tubular members that extend into the upper tubular member and the lower tubular member wherein the upper neck restraint is adapted to swivel into a position forming an inverted U-shape over the top of the lower neck restraint, and wherein the nose restraint is adapted to swivel by horizontal motion into a position forming a closed U-shape with the lower neck restraint.

The subject invention further reveals a method for attaching a cattle head restraint to a cattle chute that is equipped with a head gate, wherein said cattle head restraint is comprised of a lower neck restraint, an upper neck restraint which is mounted to the lower neck restraint, a nose restraint which is mounted to the lower neck restraint, a first cattle chute attachment adaptor, a second cattle chute attachment adaptor, a first head restraint mounting bracket, and a second head restraint mounting bracket, wherein the lower neck restraint is comprised of an upper tubular member and a lower tubular member, wherein the first cattle chute attachment adaptor and the second cattle chute attachment adaptor are attached to the lower neck restraint through tubular members that extend into the upper tubular member and the lower tubular member wherein the upper neck restraint is adapted to swivel into a position forming an inverted U-shape over the top of the lower neck restraint, and wherein the nose restraint is adapted to swivel by horizontal motion into a position forming a closed U-shape with the lower neck restraint, said method including the steps of (1) attaching the first head restraint mounting bracket to a pole on one side of the head gate, (2) attaching the second head restraint mounting bracket to a second pole on the opposite side of the head gate, (3) affixing the first cattle chute attachment adaptor to the first head restraint mounting bracket with a chute attachment pin, (4) adjusting the first cattle chute attachment adaptor and the second cattle chute attachment adaptor to fit the size of the head gate, and (5) tightening at least four set screws that are adapted to hold the first cattle chute attachment adaptor and the second cattle chute attachment adaptor in the lower neck restraint.

BRIEF DESCRIPTION OF THE DRAWINGS

FIG. 8 is a front prospective view of the head restraint of the present invention wherein the upper neck restraint and the nose restraint are in closed positions, and wherein the head and nose restraint latch is in an open position.

FIG. 16A is a side view of a head gate post having a flange that is adapted for receiving a chute side extension.

FIG. 16B is a side view of the left mounting bracket of the cattle restraint of this invention as mounted to a head gate post having a flange thereon.

DETAILED DESCRIPTION OF THE INVENTION

The head restraint of this invention is designed for utilization in conjunction with standard cattle squeeze chutes. It is particularly useful when used in conjunction with a squeeze chute having a head gate for restraining animals, particularly cattle, including, but not necessary limited to, cows, steer, bull and oxen. Also for purposes of this invention, the term cattle is deemed to also include buffalo or bison and other similar animals.

A cattle squeeze chute equipped with a head gate that can be utilized in conjunction with this invention is described in U.S. Pat. No. 5,263,438, the teachings of which are incorporated herein in their entirety. The head gates described in U.S. Pat. No. 5,263,438 are equipped with a biasing means attaching the head gate frame to the cattle squeeze chute structure which permits the head gate frame to move a limited distance in the longitudinal direction from the chute structure whereby the impact and possible injury of cattle moving longitudinally through the chute equipped with the head gate is diminished. Such a biasing means can optionally be utilized in conjunction with cattle squeeze chutes employed in accordance with this invention, but such a biasing means is not required for operability of the present invention. Another head gate design which includes a pair of animal neck-engaging yokes mounted for sliding movement on the top and bottom of the head gate frame is described in U.S. Pat. No. 5,109,802, the teachings of which are incorporated herein by reference in their entirety.

The head restraint of this invention as shown in FIG. 1 includes a lower neck restraint 1, an upper neck restraint 2, and a nose restraint 3. The lower neck restraint can be made of metal or a strong and relatively rigid polymeric material. The lower neck restraint will preferably be comprised of steel or aluminum in cases where weight reduction and corrosion resistance is being sought. Stainless steel can also be used to improve corrosion resistance.

Figure 1A:
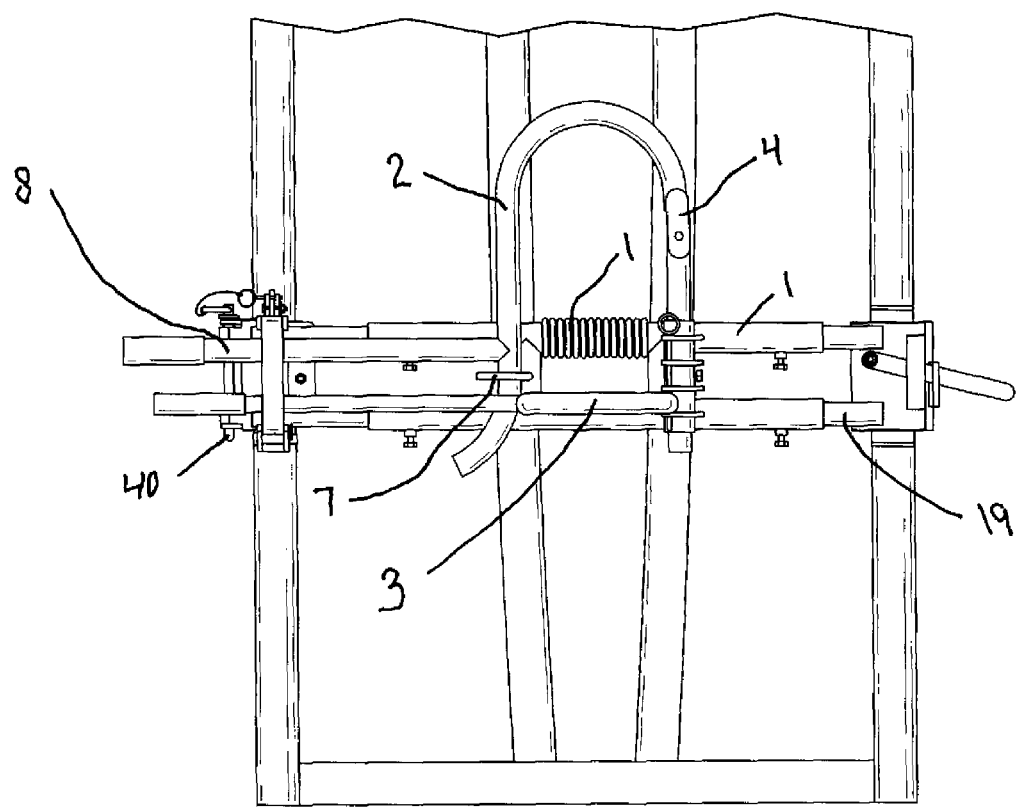
FIG. 1A is a front view of the head restraint of the present invention wherein the upper neck restraint and the nose restraint are in the closed positions.
Figure 1B:
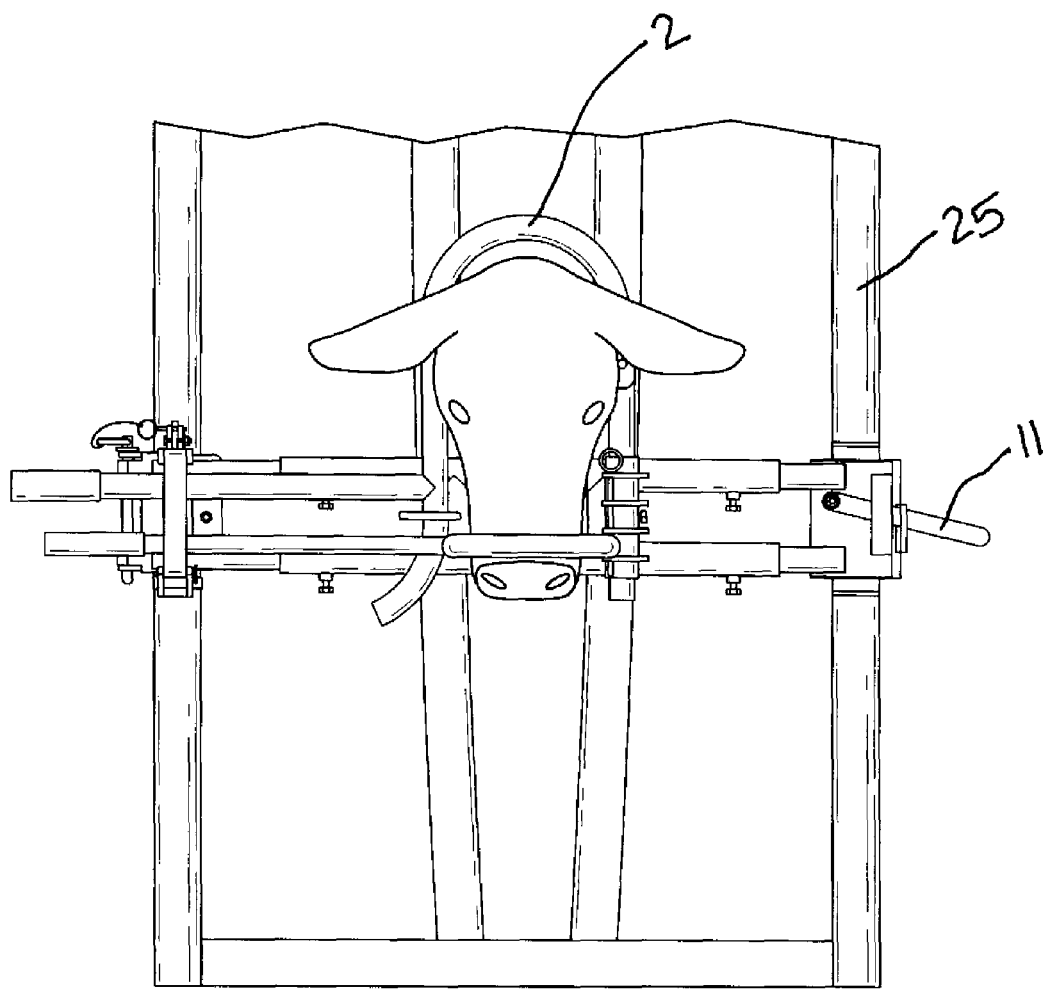
FIG. 1B is a front view of the head restraint of the present invention, wherein the head restraint is depicted as restraining a cow, wherein the upper neck restraint and the nose restraint are in the closed positions restraining the neck and the nose of the cow, respectively.
Figure 11:
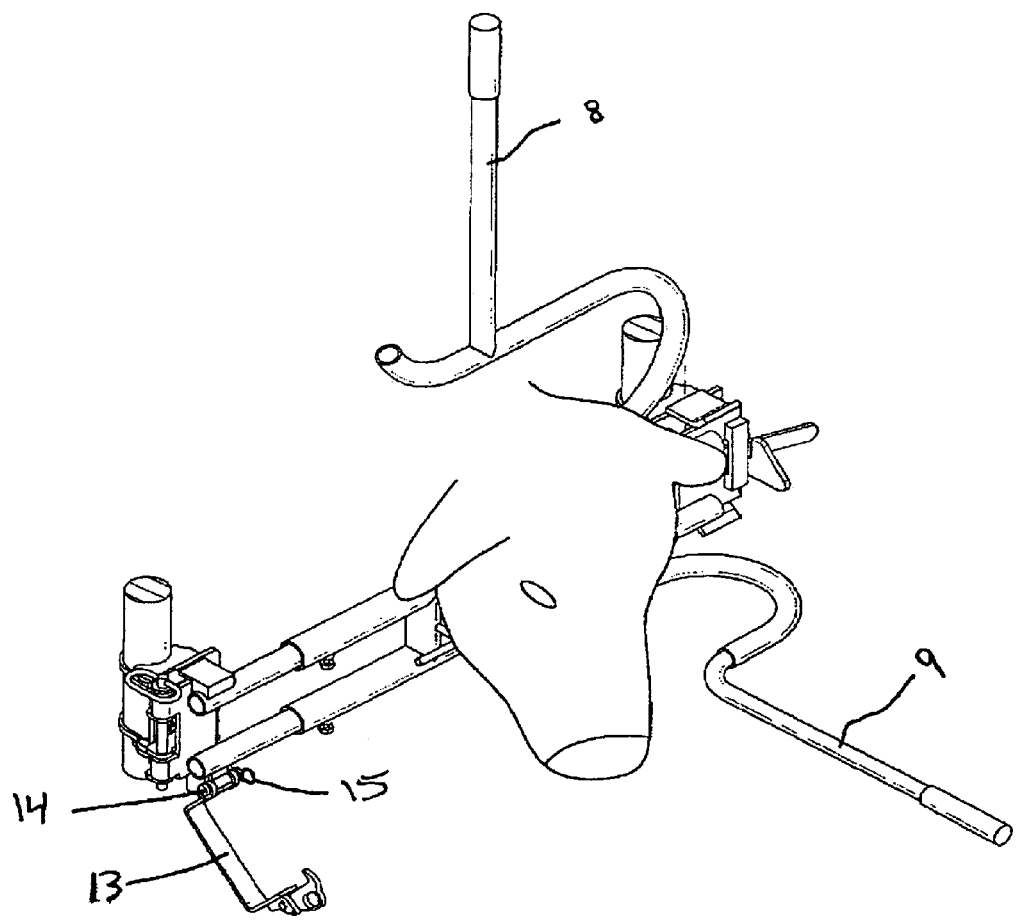
FIG. 11 is a front prospective view of the head restraint of the present invention with a cow therein, wherein the cow is in an unrestrained position, wherein the upper neck restraint is in an open position, wherein the nose restraint is in an open position, and wherein the head and nose restraint latch is in an open position.
Figure 12:
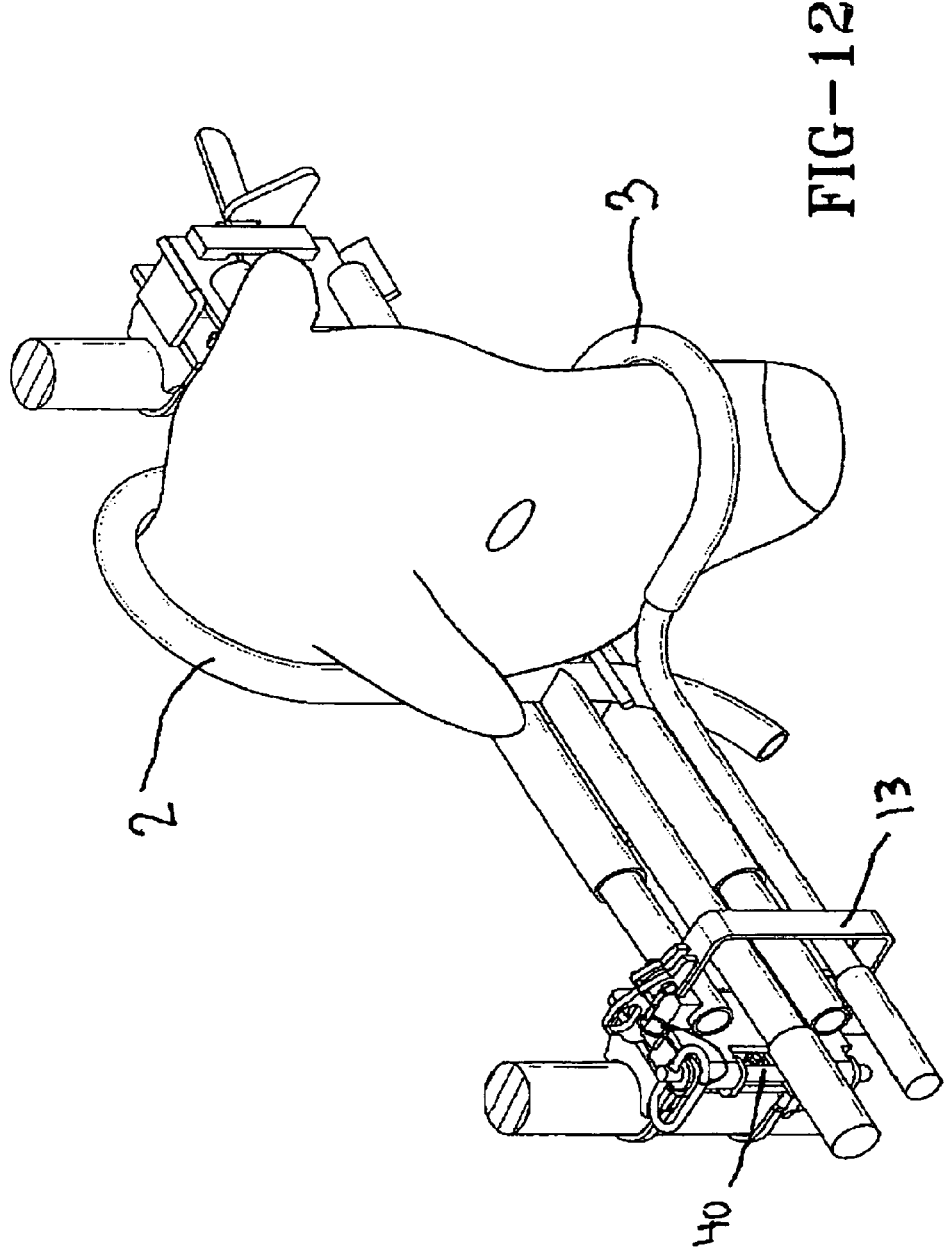
FIG. 12 is a front prospective view of the head restraint of the present invention with a cow therein, wherein the cow is in a restrained position, wherein the upper neck restraint is in the closed position, wherein the nose restraint is in the closed position, and wherein the head and nose restraint latch is in the closed position.
Figure 13:
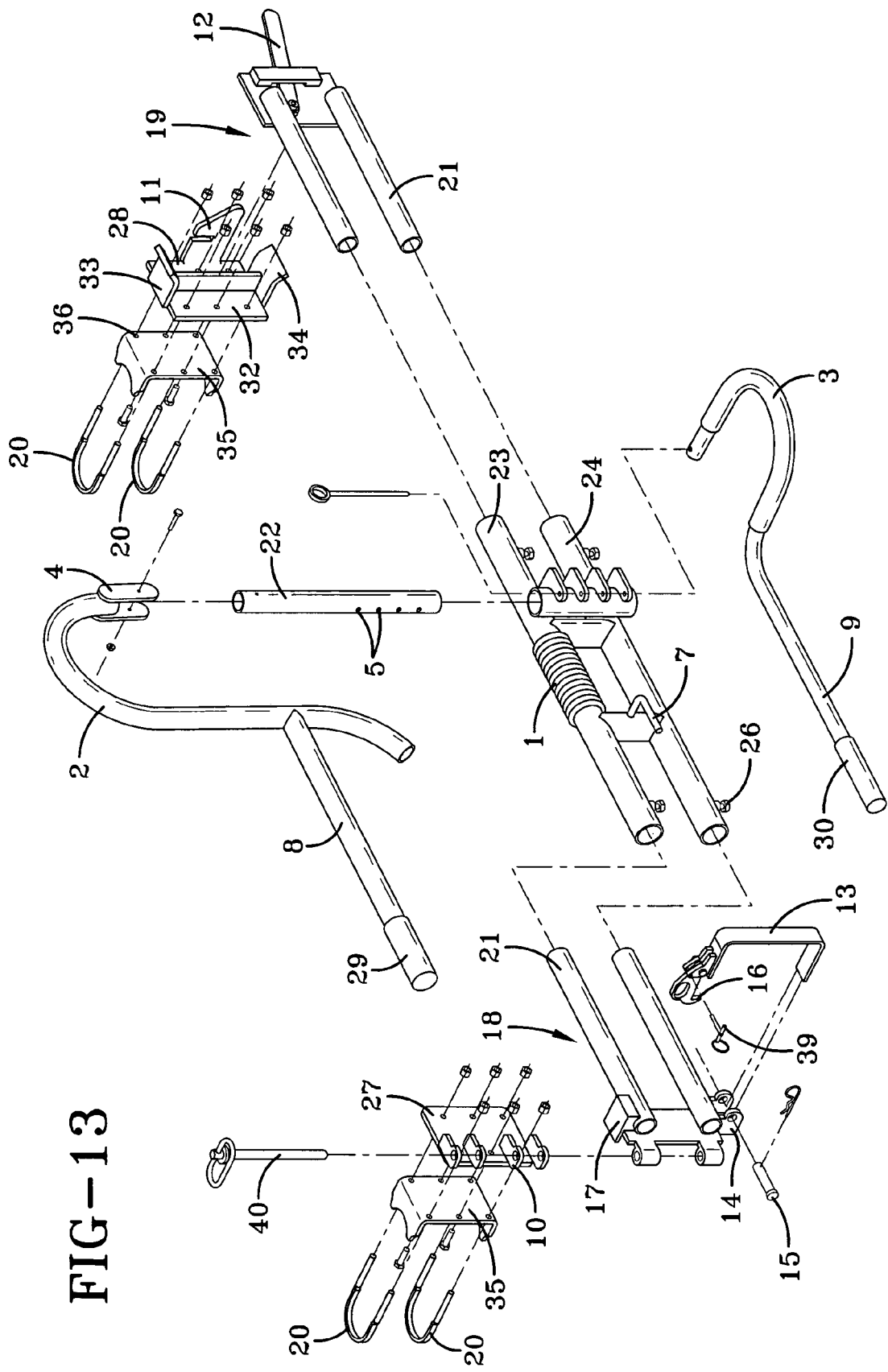
FIG. 13 is an exploded front prospective view of the head restraint of the present invention illustrating the component parts thereof.

An upper neck restraint 2 will be mounted to the lower neck restraint 1. The upper neck restraint 2 will be adapted to swivel into a position forming an inverted U-shape over the top of the lower neck restraint 1 as depicted in FIG. 1. When the upper neck restraint is in the closed position as depicted in FIG. 1, the closed inverted U will be of sufficient size to accommodate the neck of the animal being restrained. The upper neck restraint 2 will normally be affixed to the lower neck restraint 1 through an upper neck restraint hinge 4 which allows the upper neck restraint 2 to rotate from an open position for receiving cattle as depicted in FIG. 11 to a closed position for restraining the movement of animals as depicted in FIG. 1B and FIG. 12. The upper neck restraint hinge 4 will preferably be mounted to the lower neck restraint 1 in a manner whereby size adjustments can be made to accommodate animals of varying size. This can be accomplished by pinning the upper neck restraint into place as desired through an appropriate upper neck restraint adjustment hole 5 (as depicted in FIG. 13) utilizing the upper neck restraint adjustment pin 6. The upper neck restraint will typically be comprised of metal such as a carbon steel, stainless steel, or aluminum. In the closed position, the upper neck restraint 2 will preferably be held in place by an upper neck restraint stabilizer 7. The upper neck restraint stabilizer 7 will typically be a metal bar extending outwardly from the lower neck restraint 1 and will be curved, typically to about 90°, so that in the closed position the upper neck restraint 2 can fit snugly between the lower neck restraint 1 and upper neck restraint stabilizer 7. An upper neck restraint handle 8 will typically be affixed to the upper neck restraint 2 to provide leverage in moving the upper neck restraint into the closed position over the neck of an animal.

Figure 2:
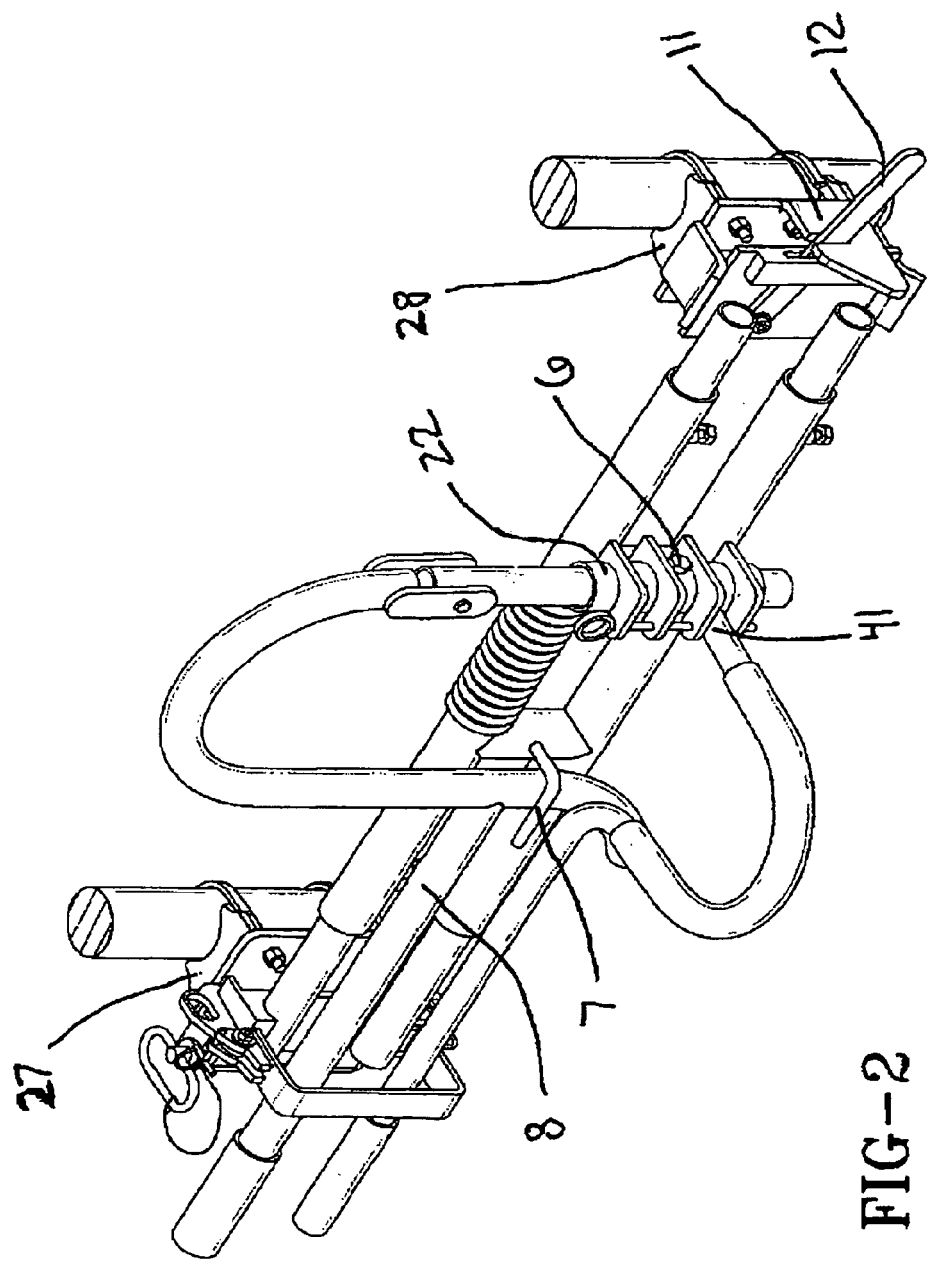
FIG. 2 is a right front prospective view of the head restraint of the present invention wherein the upper neck restraint and the nose restraint are in closed positions, and wherein the gate latch is in the locked position.
Figure 3:
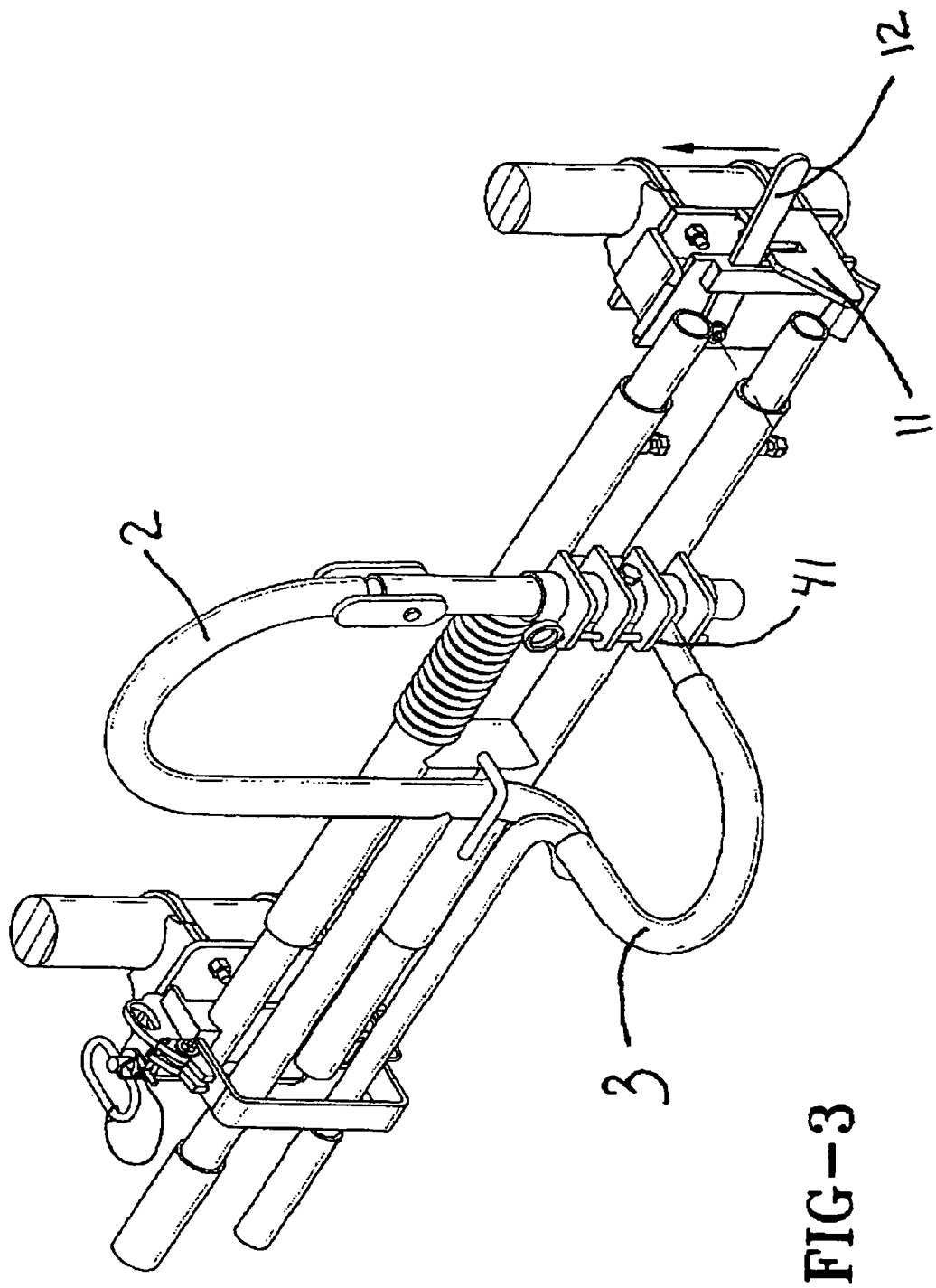
FIG. 3 is a front prospective view of the head restraint of the present invention wherein the upper neck restraint and the nose restraint are in open positions, and wherein the gate latch is in an unlocked position.
Figure 9:
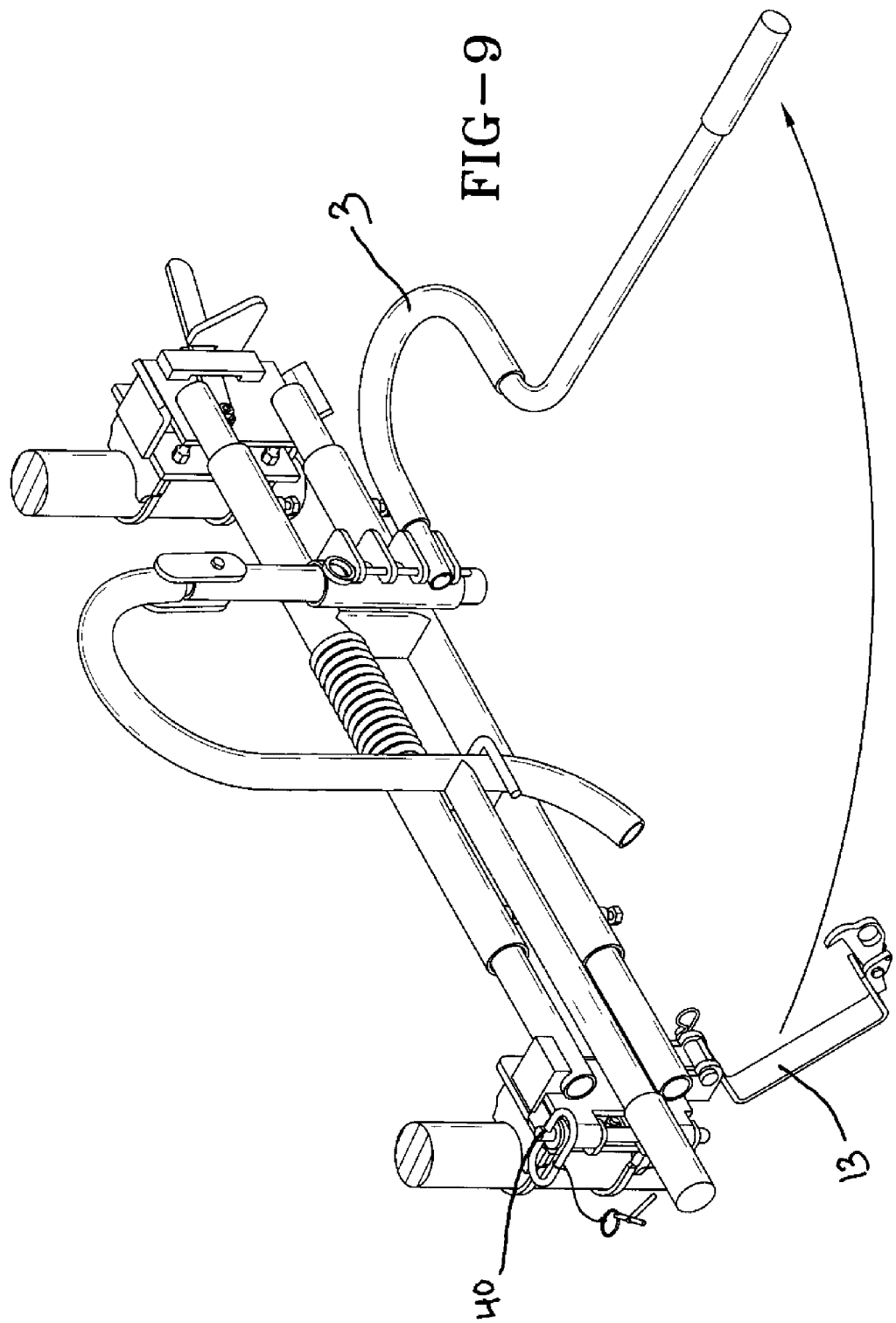
FIG. 9 is a front prospective view of the head restraint of the present invention wherein the upper neck restraint is in the closed position, wherein the nose restraint is in an open position, and wherein the head and nose restraint latch is in an open position.
Figure 10:
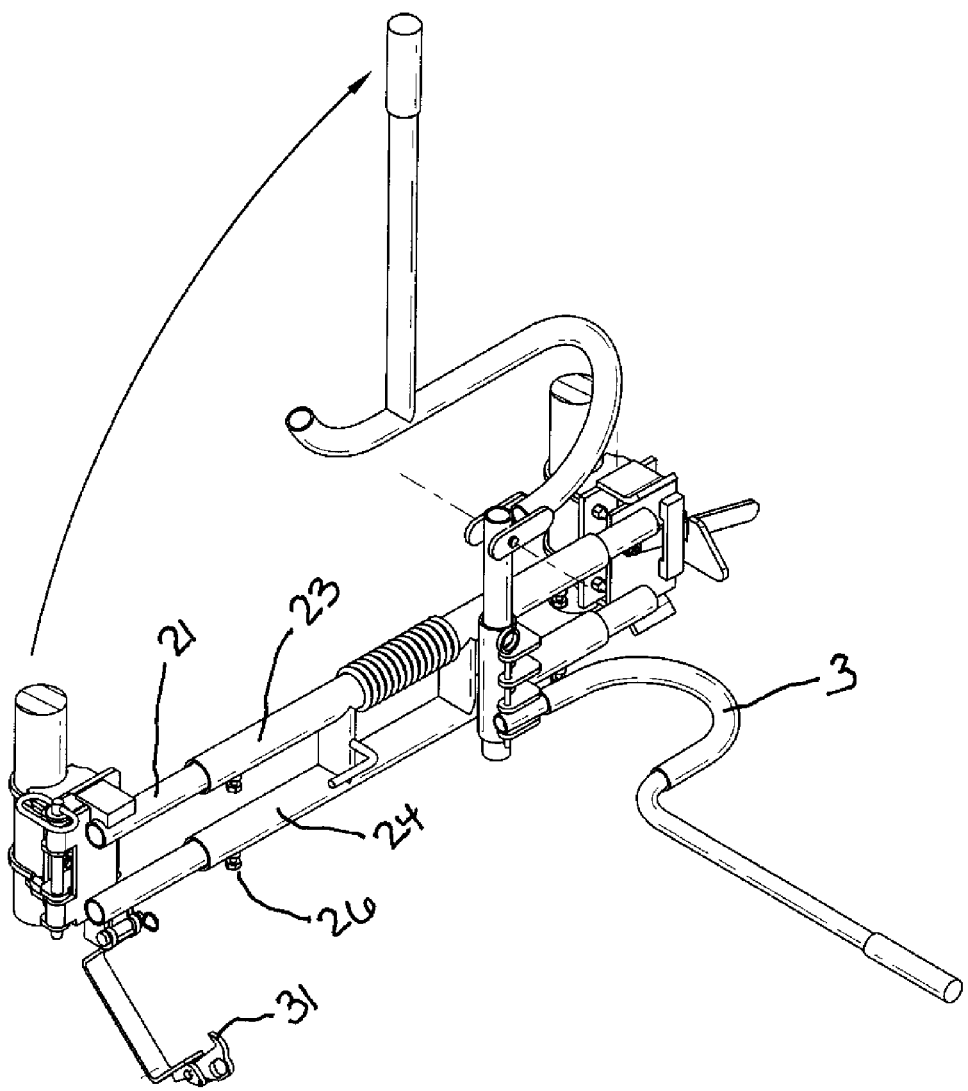
FIG. 10 is a front prospective view of the head restraint of the present invention wherein the upper neck restraint is in an open position, wherein the nose restraint is in an open position, and wherein the head and nose restraint latch is in an open position.

The nose restraint 3 will typically be pivotally mounted to the lower neck restraint 1 as depicted in FIG. 9 and FIG. 10 wherein a nose restraint hinge 4 is used to affix the nose restraint 3 to the lower neck restraint 1 through an extender tube 22. The nose restraint hinge allows the nose restraint to move from an open position as depicted in FIG. 11 to a closed position as depicted in FIG. 12. The nose restraint 3 will typically include a nose restraint handle 9 to provide leverage in pushing the animal's nose into the closed position to firmly restrain the animal. The nose restraint can optionally be padded with a soft material so as to be more comfortable for the animal. The upper neck restraint handle 8 and the nose restraint handle 9 can also be covered with a soft material, such as a rubber neck restraint handle grip 29 and/or a rubber nose restraint handle grip 30, to make it easier and more comfortable for farmer or rancher to use. The lower neck restraint will typically be affixed to a cattle squeeze chute through a chute attachment hinge 10 as shown in FIG. 2. The chute attachment hinge 10 will be designed to allow the head restraint to swing out of the way to allow cattle to exit the chute after opening the head gate doors. The chute attachment hinge 10 can include a removable pin 40 which restrains the pivoting portion of the chute attachment hinge 10 to the fixed portion of the chute attachment hinge 10. The head restraint will typically lock into a closed position utilizing a locking means for tightly affixing the lower neck restraint 1 to the frame of the head gate or cattle squeeze chute. This can be accomplished by utilizing gate lock 11 which is depicted in FIG. 2 in the locked position and which is depicted in FIG. 3 in an unlocked position. The gate lock will typically include a gate lock latch 12 as depicted in FIG. 2 and FIG. 3.

Figure 7:
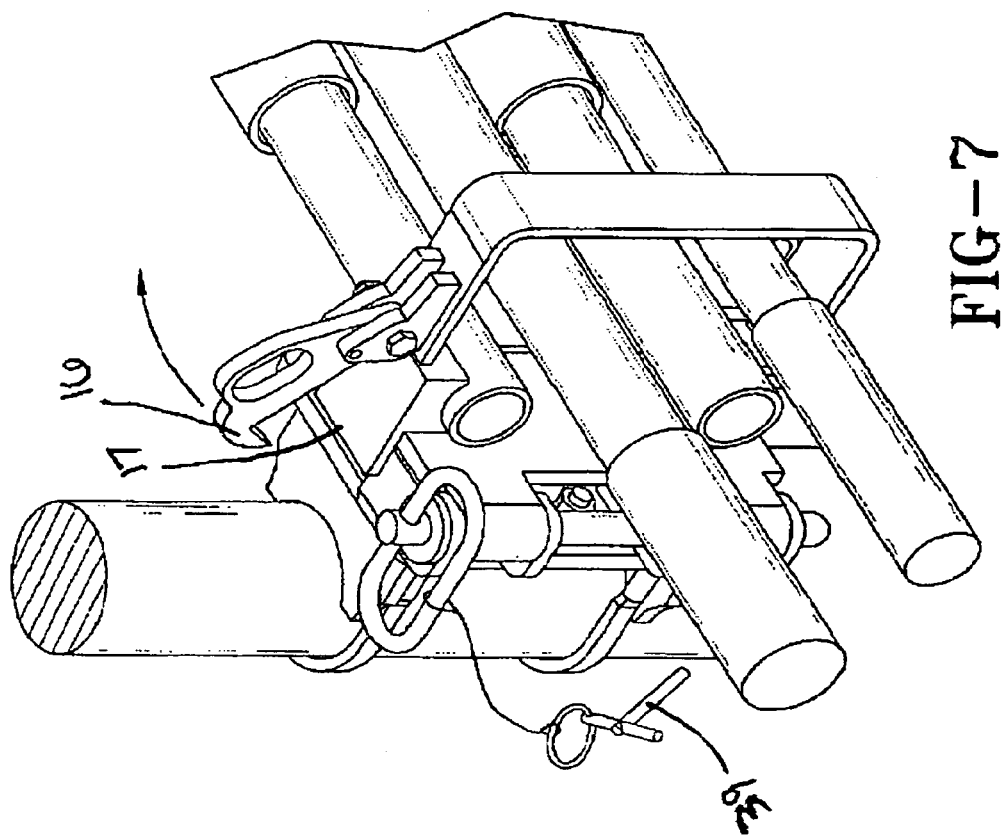
FIG. 7 is a prospective view illustrating the head and nose restraint latch of the head restraint in an unlocked position.
Figure 6:
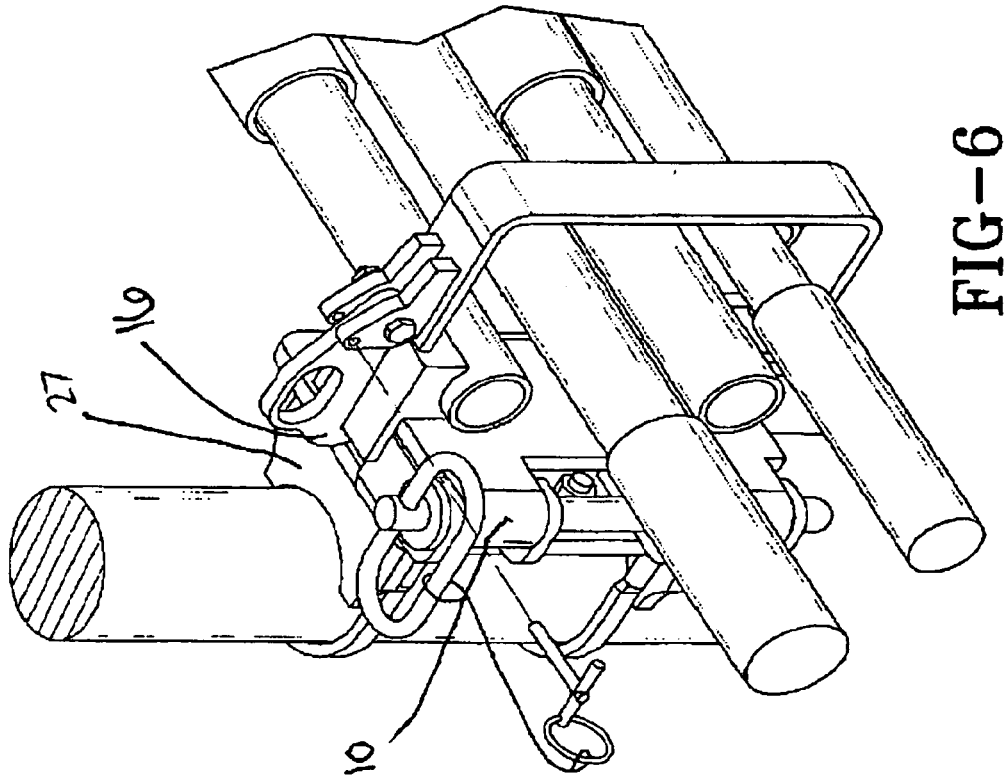
FIG. 6 is a prospective view illustrating the head and nose restraint latch of the head restraint in a locked hut unpinned position.

The upper neck restraint 2 and the nose restraint 3 will typically be locked into the closed position to securely restrain cattle being treated as illustrated in FIG. 1B and FIG. 12. This can be accomplished by any number of mechanical means that will securely hold the upper neck restraint 2 and the nose restraint 3 into the closed positions. The upper neck restraint/nose restraint lock mechanism 13 is depicted in FIG. 11 in the open (unlocked position) and in FIG. 12 in the closed (locked position). The upper neck restraint/nose restraint lock mechanism 13 will typically include a restraint lock hinge 14 on which the mechanism rotates between the open and closed positions. The neck restraint/nose restraint lock mechanism 13 will typically rotate around a lock pin 15. The neck restraint/nose restraint lock mechanism 13 will preferably be held into the locked position with a lock pin latch 16 as shown in FIG. 6. The neck restraint/nose restraint lock mechanism 13 can be unlocked by pulling the lick pin latch upwardly as illustrated in FIG. 7. The lock pin latch 16 has a rounded forward surface 31 so that it will smoothly travel over the surface of the restraint lock latch catch 17 and automatically lock into the position shown in FIG. 6 as the neck restraint/nose restraint lock mechanism 13 is being pushed from an unlocked position to a locked position. The neck restraint/nose restraint lock mechanism 13 can optionally include a locking pin 39 which is adapted to hold the lock pin latch in the locked position as depicted in FIG. 1A and FIG. 1B. The optional locking pin 39 can be removed as shown in FIG. 7 to allow the lock pin latch to be opened as illustrated in FIG. 8.

The head holder of this invention will include a first cattle chute attachment adaptor 18 and a second cattle chute attachment adaptor 19 for affixing the head holder to conventional cattle chutes that are equipped with head gates. These cattle chute attachment adaptors allow the cattle head restraints of this invention to be adjusted to fit both large and small head gates. The first cattle chute attachment adaptor 18 and the second cattle chute attachment adaptor 19 are attached to the lower neck restraint through tubular adaptor members 21 that extend into the upper tubular member 23 and the lower tubular member 24 on the lower neck restraint 1. After being adjusted to the proper size to fit the desired head gate the first cattle chute attachment adaptor 18 and the second cattle chute attachment adaptor 19 are locked into place in the lower neck restraint 1 with set screws 26 that extend through holes in the upper tubular member 23 and the lower tubular member 24.

Figure 4:
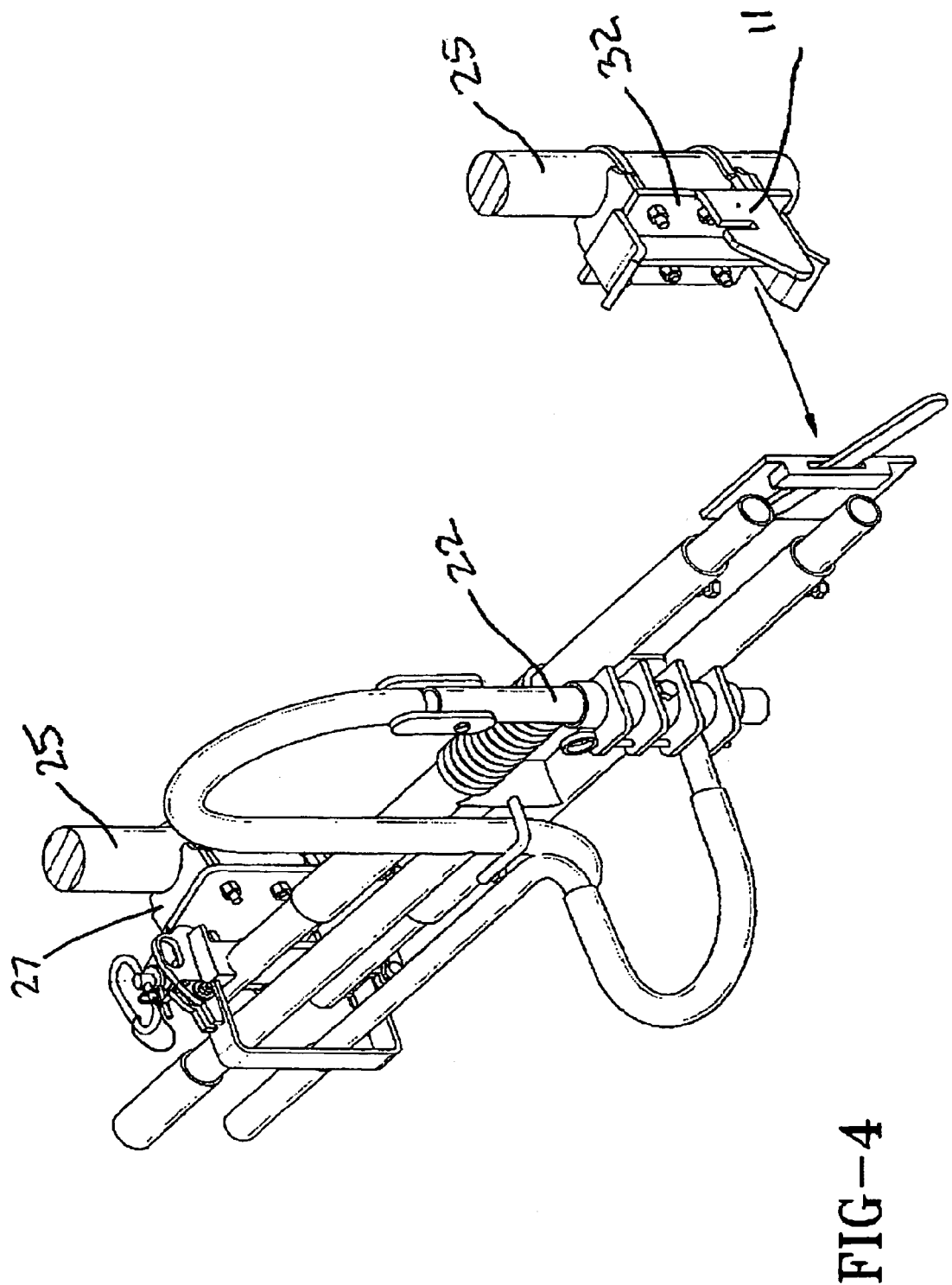
FIG. 4 is a front prospective view of the head restraint of the present invention wherein the upper neck restraint and the nose restraint are in closed positions, and wherein the head restraint gate is partially open.
Figure 5:
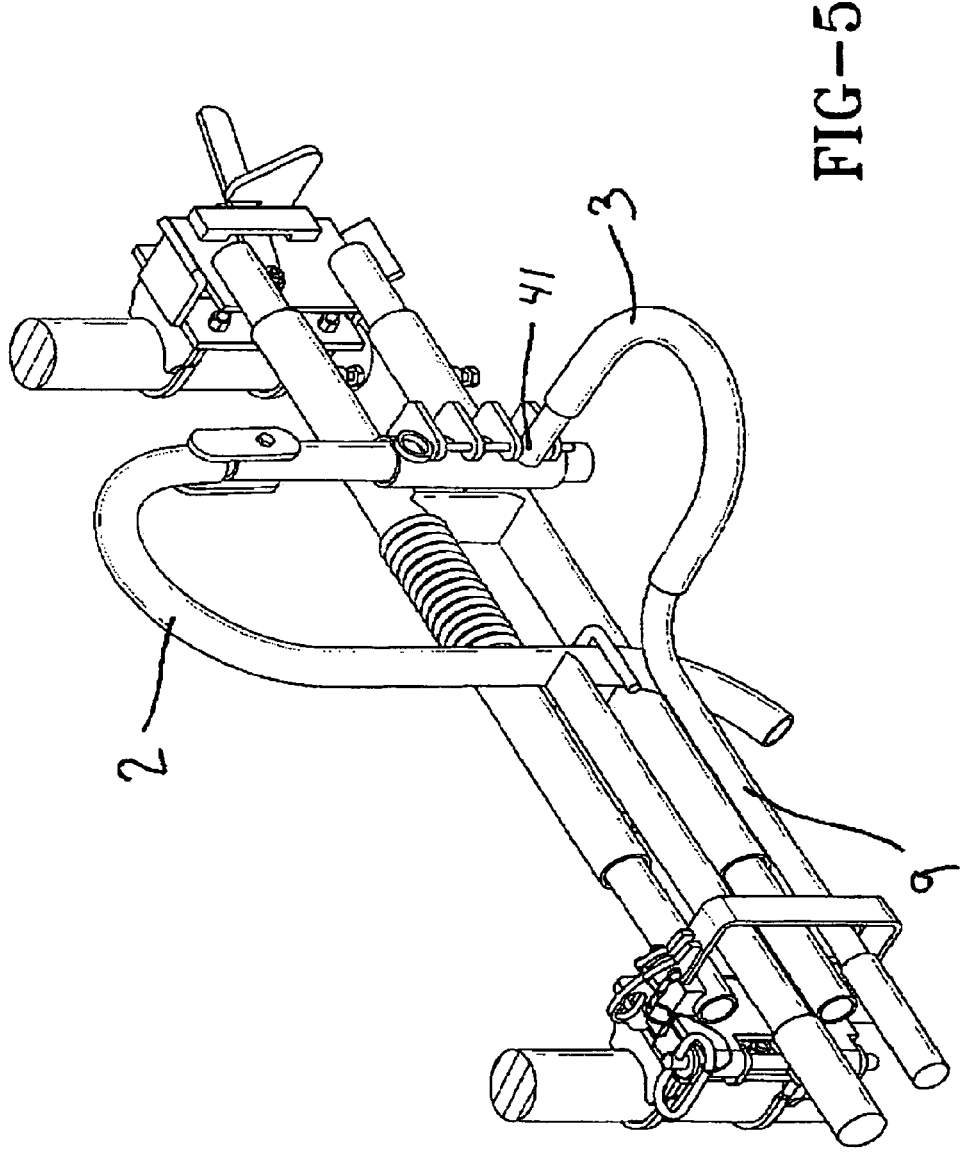
FIG. 5 is a left front prospective view of the head restraint of the present invention wherein the upper neck restraint and the nose restraint are in closed positions, and wherein the gate latch is in the locked position.

The first cattle chute attachment adaptor 18 and the second cattle chute attachment adaptor 19 are attach to the head gate through a first head gate mounting bracket 27 and a second head gate mounting bracket 28. The cattle chute mounting brackets will typically clamp to a pole 25 on the cattle chute with U-bolts 20 as depicted in FIG. 16B. FIG. 4 illustrates the attachment of the first head gate mounting bracket 27 to a pole 25 on a cattle chute. The first head gate mounting bracket will typically be comprised of a spacer plate 35 and a mounting plate 32 having a chute attachment hinge 10 and at least four U-bolt attachment holes. The second head gate mounting bracket 28 will typically be comprised of a mounting plate 32, a gate lock 11, an upper vertical alignment plate 33, a lower vertical alignment plate 34, an spacer plate 35, and at least four U-bolt attachment holes 36 as illustrated in FIG. 4 and FIG. 13. The spacer plate 35 facilitates the attachment of the cattle head restraint of this invention to a pole 25 on a head gate that includes a flange 37 that is adapted for receiving a chute side extension 38 as depicted in FIG. 16A.

Figure 14:
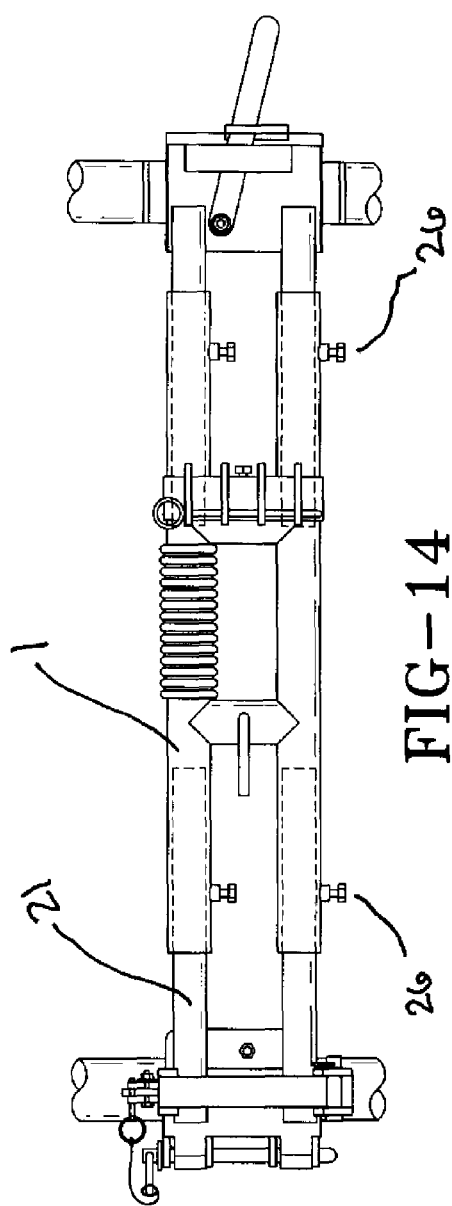
FIG. 14 is a front view of the head restraint of the present invention illustrating the ability of the head restraint assembly to be collapsed to facilitate attachment is a smaller head gate.
Figure 15:
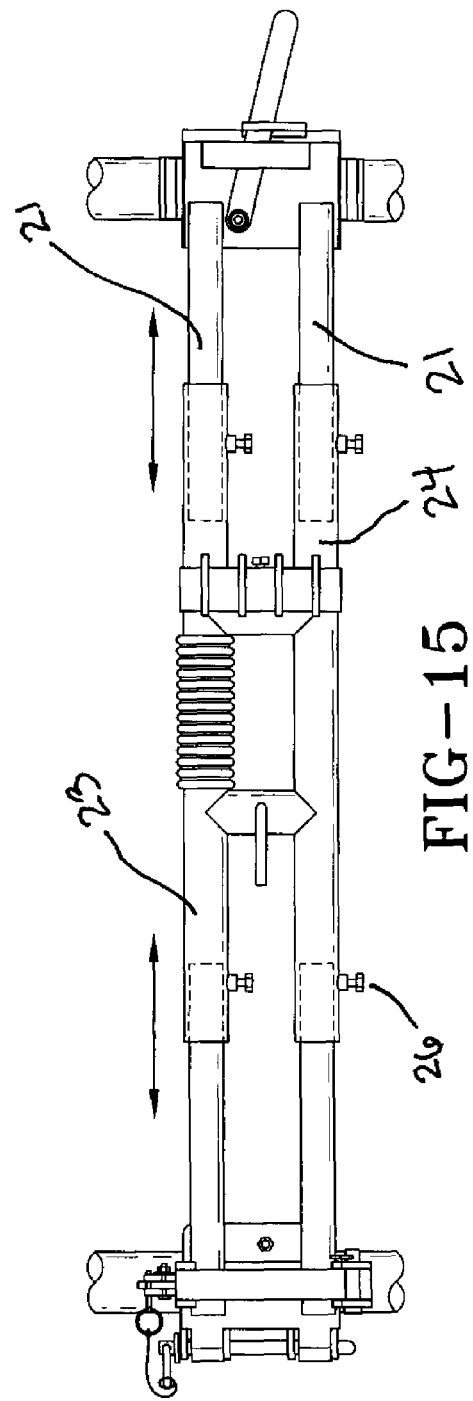
FIG. 15 is a front view of the head restraint of the present invention illustrating the ability of the head restraint assembly to be extended to facilitate attachment is a larger head gate.

FIG. 14 illustrates that the head gate of this invention can be collapsed to fit a small head gate. As shown in FIG. 15, it can also be expanded to accommodate attachment to larger head gates of virtually any size. After being expanded to the proper size to fit the head gate to which the head restraint is being mounted, the set screws 26 are tightened to fix the lower neck restraint 1, the upper neck restraint 2, and the nose restraint 3 in a centered position relative to the head gate.

The head restraint of this invention is of particular benefit in the examination or treatment of the heads and/or necks of cattle. It can be used for a wide number of procedures including, but not limited to, inserting eye drops, administering a hypodermic injection into the neck of the cattle, administering ointments or powders to the heads of cattle, administering medicine or vitamins orally, dehorning, attaching ear tags for identifying the particular animal, or attaching and removing insecticide ear tags. However, the head restraint of this invention should not be used in procedures that are being performed on lower extremities of the cattle, such as the feet.

Medications are commonly injected into the necks of cattle by farmers, ranchers, and veterinarians to treat diseases and as a health maintenance procedure. The head restraint of this invention can be beneficially utilized in administering such hypodermic injections into the necks of cattle. For instance, the cattle head restraint of this invention can be affixed to a cattle squeeze chute which is equipped with a conventional head gate. Cattle can then be driven into the cattle chute. The doors of the head gate can then be closed around the heads of the cattle. Then the upper neck restraint can be closed over the upper neck of the animal being treated with the nose restraint being closed over the nose of the animal. By virtue of the fact that the handles on the upper neck restraint and the nose restraint are relatively long, the care provider has a great deal of leverage in forcing the animal's head and neck into the restrained position. The upper neck restraint and the nose restraint are then locked into the closed position to firmly restrain the animal as shown in FIG. 1B and FIG. 12.

After being restrained in the cattle head restraint of this invention, the head of the animal can be treated as needed. For instance, the animal can be treated with eye drops, ear tagged, or injected with a medicine using a hypodermic needle and syringe while it is being restrained as depicted in FIG. 1B. During such procedures the animal typically remains calm and does not struggle. After the appropriate treatment has been administered, the nose restraint and the upper neck restraint are unlocked. Then, the nose restraint and the upper neck restraint are swung into open positions and the doors of the head gate are opened to release the head of the animal. Then, the lower neck restraint is swung away from the exit end door of the cattle squeeze chute and the exit end door of the cattle squeeze chute is opened. The animal is then driven out of the cattle squeeze chute through the exit end door. At this point, the exit end door can be closed and another animal can be driven into the squeeze chute to repeat the procedure.

In utilizing the cattle head restraint of this invention, time is saved by virtue of the fact that the animals can be quickly and easily locked into the restrained position without encountering a struggle. Additionally, utilization of the bead restraint of this invention virtually eliminates the possibility of bending or breaking hypodermic needles due to the animal suddenly jerking as the needle is inserted into the animal or during the period that the medication is being injected. This is in contrast to the conventional method of the prior art before the invention described in U.S. Pat. No. 7,225,759 where the animals are simply restrained by the use of a head gate and bull lead, but where the animals still have considerable ability to move their heads and necks up and down and from side to side. In such conventional procedures it is not uncommon for needles to bend or break in cases where the animal jerks during the procedure. On occasion cattlemen are even injured in the process of treating cattle that is restrained exclusively with a head gate. Such accidents and injury to humans can be virtually eliminated by utilizing the head restraint of this invention.

In prior art techniques before the invention described in U.S. Pat. No. 7,225,759 a bull lead was typically utilized in an attempt to adequately restrain the heads of the cattle. Because the bull lead tightly pinches the nostrils of the animals being treated or examined it causes the animal a level of discomfort that typically causes the animal to cry, squeal and struggle throughout the entire procedure. The head restraint of this invention eliminates the need to employ a bull lead while conducting procedures on the heads and/or necks of cattle. Accordingly, the utilization of the head restraint of this invention is presumably much more humane for the animals because the need for a bull lead is eliminated and consequently the animals treated do not typically cry, squeal or struggle.

EXAMPLE

The cattle head restraint of this invention was quickly and easily attached to cattle squeeze chutes that were equipped with conventional head gates of various brands and sizes. After being attached to the conventional head gates cattle were driven into the cattle chute and locked into the restrained position as shown in FIG. 1B. In some cases, eye drops were inserted into the eyes of the animals while their head was being restrained as depicted in FIG. 1B. During the treatment process, the animals remained calm and did not struggle significantly. In utilizing the head restraint of this invention, time was saved by virtue of the fact that the cows could be quickly and easily locked into the restrained position. Additionally, virtually no eye drops were lost because the farmer could accurately insert the drops into the animals' eyes. This is in contrast to the conventional method of the prior art where the animals are simply restrained by the head gate but still have considerable ability to move their heads up and down and from side to side. Additionally, a bull lead is typically utilized in an attempt to adequately restrain the heads of the animals in the conventional procedures of the prior art. In such prior art procedures, the animals typically cry, squeal and struggle throughout the entire procedure. Accordingly, the utilization of the head restraint of this invention is presumable much more humane for the animals because the animals treated utilizing the head restraint of this invention did not cry, squeal or struggle.

While certain representative embodiments and details have been shown for the purpose of illustrating the subject invention, it will be apparent to those skilled in this art that various changes and modifications can be made therein without departing from the scope of the subject invention.

What is claimed is:

1. A head restraint for utilization in conjunction with a cattle chute, said head restraint being expandable to fit directly onto head gates of differing sizes and with said head restraint being comprised of a lower neck restraint, an upper neck restraint which is mounted to the lower neck restraint, a nose restraint which is mounted to the lower neck restraint, a first cattle chute attachment adaptor, a second cattle chute attachment adaptor, and a first head gate mounting bracket comprising a spacer plate and a mounting plate having a chute attachment hinge, wherein the lower neck restraint is comprised of an upper tubular member and a lower tubular member, wherein the first cattle chute attachment adaptor and the second cattle chute attachment adaptor are attached to the lower neck restraint through tubular members that extend into the upper tubular member and the lower tubular member, wherein the upper neck restraint is adapted to swivel into a position forming an inverted U-shape over the top of the lower neck restraint, and wherein the nose restraint is adapted to swivel by horizontal motion into a position forming a closed U-shape with the lower neck restraint.

2. The head restraint for utilization in conjunction with a cattle chute as specified in claim 1 wherein the mounting plate includes at least four holes that are adapted for attaching the mounting bracket to a pole on a head gate with U-bolts.

3. The head restraint for utilization in conjunction with a cattle chute as specified in claim 1 which further comprises a second head gate mounting bracket which is comprised of a spacer plate and a mounting plate, wherein the mounting plate of the second head gate mounting bracket includes a gate lock, an upper vertical alignment plate, and a lower vertical alignment plate.

4. The head restraint for utilization in conjunction with a cattle chute as specified in claim 3 wherein the mounting plate of the second head gate mounting bracket includes at least four holes that are adapted for attaching the second head gate mounting bracket to a pole on a head gate with U-bolts.

5. The head restraint for utilization in conjunction with a cattle chute as specified in claim 1 which further comprises an upper neck restraint/nose restraint lock mechanism, wherein the upper neck restraint/nose restraint lock mechanism is comprised of a restraint lock hinge, a lock pin, a lock pin latch, and a restraint lock latch catch.

6. The head restraint for utilization in conjunction with a cattle chute as specified in claim 5 wherein the lock pin latch has a rounded forward surface that is adapted to facilitate travel over the restraint lock latch catch.

7. A head restraint as specified in claim 1 wherein the nose restraint includes a nose restraint handle.

8. The head restraint for utilization in conjunction with a cattle chute as specified in claim 7 wherein the nose restraint handle includes a handle grip which is made with a soft material.

9. A head restraint as specified in claim 1 which is further comprised of an upper neck restraint stabilizer which is affixed to the lower neck restraint.

10. A head restraint as specified in claim 1 wherein the upper neck restraint is adapted to swivel into a position forming a closed U-shape with the lower neck restraint wherein the upper neck restraint is stabilized with respect to horizontal motion by an upper neck restraint stabilizer.

11. A head restraint as specified in claim 1 wherein the upper neck restraint is padded with a soft material.

12. A head restraint as specified in claim 1 wherein the nose restraint is padded with a soft material.

13. The head restraint for utilization in conjunction with a cattle chute as specified in claim 1 wherein the upper neck restraint is adjustable to accommodate the size of cow being restrained therein.

14. The head restraint for utilization in conjunction with a cattle chute as specified in claim 1 wherein the nose restraint is adjustable to accommodate the size of cow being restrained therein.

15. The head restraint for utilization in conjunction with a cattle chute as specified in claim 1 wherein the upper neck restraint includes an upper neck restraint handle.

16. The head restraint for utilization in conjunction with a cattle chute as specified in claim 15 wherein the upper neck restraint handle includes a handle grip which is made with a soft material.

* * * * *